July 15, 1958   H. M. McCONNELL ET AL   2,843,768
EXCITATION CIRCUIT FOR BRUSHLESS ALTERNATOR
Filed Dec. 3, 1956
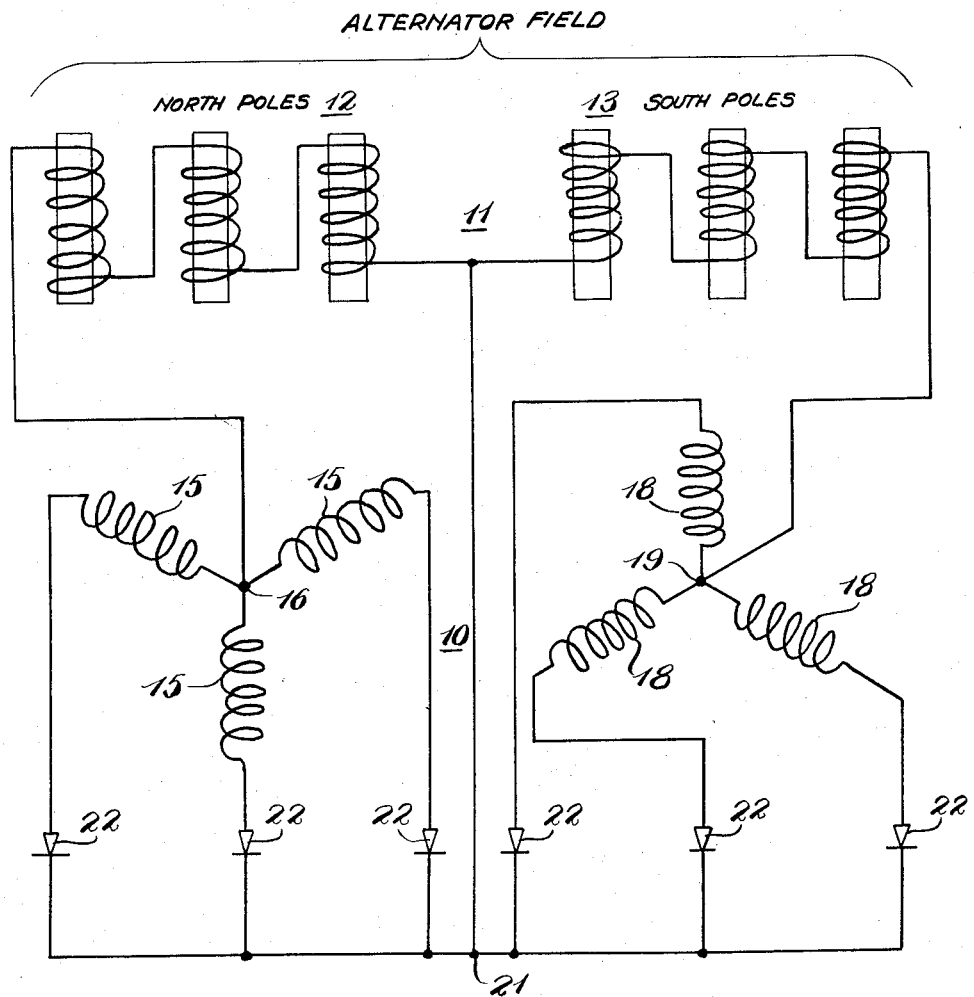
INVENTORS
HOWARD M. McCONNELL
BY JAMES N. ELLIS
ATTORNEY

United States Patent Office 2,843,768
Patented July 15, 1958

2,843,768

EXCITATION CIRCUIT FOR BRUSHLESS ALTERNATOR

Howard M. McConnell, Chagrin Falls, and James N. Ellis, Cleveland, Ohio, assignors to Jack & Heintz, Inc., Cleveland, Ohio, a corporation of Delaware Application December 3, 1956, Serial No. 625,960

4 Claims. (Cl. 310—68)

The present invention relates to dynamoelectric machines, and, more particularly, to an excitation circuit especially adapted to brushless alternators.

In a brushless alternator and associated exciter a common shaft carries the armature winding of the exciter for the alternator and the main field windings of the alternator. Exciter field coils are supported adjacent the exciter armature windings. The alternating currents induced in the exciter armature windings are rectified by rectifiers placed on the common shaft and connected to the alternator field coils to provide the necessary excitation. The exciter armature windings have frequently been polyphase double star connected windings.

It has, heretofore, been proposed to connect an interphase transformer between the neutrals of the double star connected windings of an exciter to absorb the alternating voltage appearing between the neutrals, and thereby achieve a more favorable use of the rectifiers.

The principal object of the present invention is to provide a new and improved excitation circuit for a brushless alternator having a polyphase double star connected exciter armature winding for providing direct current excitation current for the alternator main field coils, and in which any alternating voltage between the neutrals is absorbed by the main field coils of the alternator with the circuit preferably being such that the ampere turns per pair of poles of the main field winding is not affected by circulating currents between the neutrals or direct current unbalance between the two circuits due to resistance changes in the circuits.

Further objects and advantages of the present invention will be apparent from the following detailed description of the preferred embodiment made with reference to the accompanying drawing in which the sole figure is a schematic showing of an alternator embodying the present invention.

Referring to the drawing, the present invention is embodied in an alternator and associated exciter having an exciter armature winding 10 and a main alternator field winding 11. The main alternator field winding is shown as having three north pole windings 12 and three south pole windings 13.

The main alternator field winding 11 derives its excitation current from the exciter armature winding 10 which is a polyphase double star connected winding comprising, in the illustrated embodiment, three star connected armature coils 15 having a neutral point 16 and three star connected armature coils 18 having a neutral point 19 with the corresponding coils of the star connections being 180° out of phase as is conventional in the art. The outer ends of the coils 15, 18 are connected to a common junction 21 through individual rectifiers 22, which, in the illustrated embodiment, conduct current from the coils to the junction 21.

The N pole windings 12 of the main alternator field windings are connected in series with each other between the neutral point 16 and the junction 21 while the S pole windings 13 of the main alternator field windings are connected in series between the neutral 19 and the junction 21.

In the described circuit the main alternator field windings present a high impedance path between the neutrals of the star connected exciter windings and eliminate the necessity of providing an interphase transformer to absorb the alternating current appearing between the neutrals. Since the N poles of the alternator field windings are connected in series between one neutral and the common junction 21 and the S poles of the main alternator field windings in series between the other neutral and the common junction 21, circulating currents and direct current voltage unbalance between the star connected exciter windings will not alter the ampere turns per pair of poles. It will be noted that a current flowing between the neutral 16 and the neutral 19 will increase the ampere turns of one set of poles to compensate for the decrease in ampere turns for the other set of poles.

It can now be seen that the objects heretofore enumerated and others have been accomplished and that a new and improved excitation circuit for a brushless alternator has been provided wherein the main alternator field coils provide a high impedance path between the neutrals of a polyphase double star connected exciter armature winding with the exciting circuit being so constructed and arranged that circulating currents or direct current voltage unbalance between the star connected circuits do not affect the ampere turns per pair of poles of the main alternator field winding.

While the preferred embodiment of the present invention has been described in considerable detail, it is hereby our intention to aver all modifications, constructions and arrangements thereof which fall within the ability of those skilled in the art and the scope of the appended claims.

What we claim is:

1. In an alternator having a main alternator field winding including an N pole winding and an S pole winding and an exciter having an armature winding for providing excitation current for the main alternator field winding, said exciter armature winding comprising a first plurality of star connected phase coils having their one sides connected to a neutral, respective circuit means connecting the other sides of said coils to a junction and each including a rectifying element, all of said elements conducting current in the same direction relative to said junction, a second plurality of star connected phase coils having their one ends connected to a second neutral, respective circuit means connecting the other ends of said coils to said junction and each including a rectifying element, the last-mentioned rectifying elements conducting in the same direction relative to said junction as the first mentioned rectifying elements, means connecting said N pole windings of said alternator between said first neutral and said junction and said S pole windings of said alternator between said second neutral and said junction.

2. In an alternator having a main alternator field winding including a N pole winding and a S pole winding and an exciter having an armature winding for providing excitation current for the main alternator field winding, said exciter armature winding comprising a first plurality of star connected phase coils having their one sides connected to a neutral, respective circuit means connecting the other sides of said coils to a junction and each including a rectifying element, all of said elements conducting current in the same direction relative to said junction, a second plurality of star connected phase coils having their one ends connected to a second neutral, respective circuit means connecting the other ends of said coils to said junction and each including a rectifying element, the last-mentioned rectifying elements conducting in the same direction relative to said junction as the first mentioned rectifying elements, means connecting said N pole windings of said alternator between said first neutral and said junction and said S pole windings of said alternator between said second neutral and said junction, said N and S pole windings of said alternator each comprising a plurality of series connected pole windings.

3. In an alternator having a main field winding including an N pole winding and a S pole winding and an exciter having an armature winding for providing excitation current for the main alternator field winding, said exciter armature winding comprising a first plurality of star connected phase coils having their one sides connected to a neutral, respective circuit means connecting the other sides of said coils to a junction and each including a rectifying element, all of said elements conducting current in the same direction relative to said junction, a second plurality of star connected phase coils having their one ends connected to a second neutral, respective circuit means connecting the other ends of said coils to said junction and each including a rectifying element, the last-mentioned rectifying elements conducting in the same direction relative to said junction as the first mentioned rectifying elements, means connecting said N pole windings of said alternator between said first neutral and said junction and said S pole windings of said alternator between said second neutral and said junction, said first and second plurality of star connected phase coils of said exciter each comprising three phase coils.

4. In an alternator having a main field winding including an N pole winding and a S pole winding and an exciter having an armature winding for providing excitation current for the main alternator field winding, said exciter armature winding comprising a first plurality of star connected phase coils having their one sides connected to a neutral, respective circuit means connecting the other sides of said coils to a junction and each including a rectifying element, all of said elements conducting current in the same direction relative to said junction, a second plurality of star connected phase coils having their one ends connected to a second neutral, respective circuit means connecting the other ends of said coils to said junction and each including a rectifying element, the last-mentioned rectifying elements conducting in the same direction relative to said junction as the first-mentioned rectifying elements, means connecting said N pole windings of said alternator between said first neutral and said junction and said S pole windings of said alternator between said second neutral and said junction, said N and S pole windings of said alternator each comprising a plurality of series connected pole windings, said first and second plurality of star connected phase coils of said exciter each comprising three phase coils.

References Cited in the file of this patent
FOREIGN PATENTS 302,931      Great Britain _____ Dec. 5, 1929